US012565574B2

(12) United States Patent
Mo et al.

(10) Patent No.: US 12,565,574 B2
(45) Date of Patent: Mar. 3, 2026

(54) LASER MARKING AND SHADING ENHANCED PBT COMPOSITION AND PREPARATION METHOD AND USE THEREOF

(71) Applicant: KINGFA SCI. & TECH. CO., LTD., Guangdong (CN)

(72) Inventors: Wenjie Mo, Guangdong (CN); Xianbo Huang, Guangdong (CN); Nanbiao Ye, Guangdong (CN); Wen Zhu, Guangdong (CN); Dejun Gong, Guangdong (CN); Jian Feng, Guangdong (CN); Xuejun Fu, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 567 days.

(21) Appl. No.: 18/033,806

(22) PCT Filed: Mar. 24, 2021

(86) PCT No.: PCT/CN2021/082800
§ 371 (c)(1),
(2) Date: Apr. 26, 2023

(87) PCT Pub. No.: WO2022/088598
PCT Pub. Date: May 5, 2022

(65) Prior Publication Data
US 2023/0391988 A1 Dec. 7, 2023

(30) Foreign Application Priority Data

Oct. 29, 2020 (CN) .......................... 202011182810.5

(51) Int. Cl.
| | |
|---|---|
| C08K 13/04 | (2006.01) |
| C08J 3/20 | (2006.01) |
| C08J 7/12 | (2006.01) |
| C08K 3/04 | (2006.01) |
| C08K 3/22 | (2006.01) |
| C08K 5/13 | (2006.01) |
| C08K 7/14 | (2006.01) |

(52) U.S. Cl.
CPC .............. C08K 13/04 (2013.01); C08J 3/203 (2013.01); C08J 7/123 (2013.01); C08J 2367/02 (2013.01); C08K 3/04 (2013.01); C08K 2003/2241 (2013.01); C08K 5/13 (2013.01); C08K 7/14 (2013.01); C08K 2201/003 (2013.01); C08K 2201/004 (2013.01); C08K 2201/014 (2013.01)

(58) Field of Classification Search
None
See application file for complete search history.

(56) References Cited

U.S. PATENT DOCUMENTS

| | | | | |
|---|---|---|---|---|
| 6,420,449 | B1 * | 7/2002 | Sagane ................. | C08K 5/098 |
| | | | | 106/31.35 |
| 2006/0030631 | A1 | 2/2006 | Shah et al. | |

FOREIGN PATENT DOCUMENTS

| | | | | | |
|---|---|---|---|---|---|
| CN | 101423653 | | 5/2009 | | |
| CN | 102719062 | | 10/2012 | | |
| CN | 102719062 | A * | 10/2012 | .............. | B29B 7/72 |
| CN | 103951946 | A * | 7/2014 | .............. | B29B 7/90 |
| CN | 107201011 | | 9/2017 | | |
| CN | 109486128 | A * | 3/2019 | .............. | C08L 25/06 |
| CN | 109880308 | | 6/2019 | | |
| CN | 112375345 | | 2/2021 | | |
| CN | 112375347 | A * | 2/2021 | ........... | C08K 5/0091 |
| CN | 114806101 | A * | 7/2022 | .............. | C08L 67/02 |
| JP | H08507099 | A * | 7/1996 | .............. | C08L 67/00 |
| KR | 20110057254 | A * | 5/2011 | ........... | B29C 48/29 |
| KR | 20110086377 | A * | 7/2011 | .............. | C08L 67/03 |
| KR | 102885318 | B1 * | 11/2025 | ........... | C09J 133/04 |
| WO | 0211339 | | 2/2002 | | |

OTHER PUBLICATIONS

"International Search Report (Form PCT/ISA/210) of PCT/CN2021/082800", mailed on Jul. 21, 2021, with English translation thereof, pp. 1-6.

* cited by examiner

*Primary Examiner* — Sanza L. McClendon
(74) *Attorney, Agent, or Firm* — JCIPRNET

(57) ABSTRACT

Provided is a laser marking shading enhanced PBT composition, comprising, in parts by weight, the following components: 50-80 parts of a PBT resin, 6-20 parts of an opacifying agent, 15-30 parts of fiberglass, 0.1-0.5 parts of an antioxidant, and carbon black accounting for 0.0033-0.033% of the weight of the opacifying agent. In the present invention, when performing compounding with only an opacifying agent and a trace amount of carbon black without the use of an expensive laser marking agent, the composition has the properties of a whiteness value of more than 90, a shading of less than 3 mm, and a color difference value of more than 15 before and after laser marking. Therefore, the composition can be applied in the field of preparing lamp cup housings, capacitors, connectors, or relay articles in the lighting industry.

17 Claims, No Drawings

LASER MARKING AND SHADING ENHANCED PBT COMPOSITION AND PREPARATION METHOD AND USE THEREOF

CROSS-REFERENCE TO RELATED APPLICATION

This application is a 371 of international application of PCT application serial no. PCT/CN2021/082800, filed on Mar. 24, 2021, which claims the priority benefit of China application no. 202011182810.5, filed on Oct. 29, 2020. The entirety of each of the above mentioned patent applications is hereby incorporated by reference herein and made a part of this specification.

TECHNICAL FIELD

The present invention relates to the technical field of engineering plastics, and more particularly, to a laser marking and shading enhanced PBT composition used in lighting industry, and a preparation method and use thereof.

BACKGROUND

Polybutylene Terephthalate (PBT) is a semi-transparent to non-transparent milky white crystalline thermoplastic polyester that is an important member of the five major engineering plastics. PBT is commonly used for lamp cup shells in the lighting industry. The performance requirements of the lamp cup shells usually include flame retardancy, thermal shock cycle, shading, laser marking, heat resistance, etc. At present, a main method to solve the problem of shading performance is to add a large amount of a shading agent, and a main method to solve the problem of laser marking performance is to add a laser marking agent. However, the laser marking agent is expensive, and it is difficult to prepare inexpensive materials with good shading performance and laser marking performance.

Chinese patent (CN107201011A) discloses a laser markable high-shading polyester composite material for LED (Light Emitting Diode), and specifically discloses a polyester, a glass fiber, an antioxidant and laser marking powder, however, the laser marking powder in this patent is at least one of a tin oxide, an antimony oxide and a neodymium oxide, which are expensive and not conducive to industrial large-scale production.

Therefore, current laser marking materials are expensive and cannot be industrially produced on a large scale. It is urgent to develop an inexpensive composite material with a good laser marking effect.

SUMMARY OF INVENTION

A purpose of the present invention is to provide a laser marking and shading enhanced PBT composition in order to overcome the defects that laser marking materials in prior art are expensive and cannot be produced on a large scale. The PBT composition has both the effects of laser marking and shading.

Another purpose of the present invention is to provide a preparation method of the laser marking and shading enhanced PBT composition.

Another purpose of the present invention is to provide a use of the laser marking and shading enhanced PBT composition.

The purposes of the present invention are achieved through the following technical solutions:

A laser marking and shading enhanced PBT composition, including the following components in parts by weight:

50 to 80 parts of a PBT resin;

6 to 20 parts of a shading agent;

15 to 30 parts of a glass fiber;

0.1 to 0.5 part of an antioxidant; and a carbon black being 0.0033% to 0.033% of a weight of the shading agent.

According to the present invention, through the combination of the shading agent and the carbon black, a laser marking effect of the PBT composition is improved. The shading agent plays a role in reflecting light in the composition, while the carbon black carbonizes the resin while absorbing laser, to form a carbonization layer that acts as a marking agent. However, the carbon black is also a pigment, adding the carbon black too much can easily change a ground color, and adding the carbon black too little results in insufficient contrast and cannot achieve an effect of marking. The shading agent of the present invention can further improve contrast, so that laser marking is clearer, a shading effect with a whiteness value greater than 90 and a thickness less than 3 mm is achieved, and a color difference before and after laser marking can reach above 15.

Preferably, the composition includes the following components in parts by weight:

50 to 60 parts of a PBT resin;

15 to 20 parts of a shading agent;

15 to 30 parts of a glass fiber;

0.1 to 0.5 part of an antioxidant; and a carbon black being 0.0033% to 0.033% of a weight of the shading agent.

Preferably, the shading agent is one or more of titanium dioxide, zinc sulfide and antimony white.

Preferably, the shading agent is the titanium dioxide.

The addition of the shading agent not only improves the shading performance of the resin, but also can synergize with traces of the carbon black to improve the effect of laser marking.

Preferably, the carbon black is an acetylene carbon black or a conductive carbon black. If a use amount of the carbon black exceeds 0.033% of the weight of the shading agent, a color of a material is too dark, and a whiteness value is below 90, so a function of "marking black on white" cannot be achieved (i.e., displaying a dark marker on a light-colored polymer); a weight of the carbon black cannot be less than 0.0033% of the weight of the shading agent, if the weight of the carbon black is too small, the carbonization layer will become light, and a contrast between a background part and a laser marking part will decrease, so the effect of laser marking cannot be achieved. In addition, the carbon black can also synergize with the shading agent to improve the shading effect.

A measurement method for a content of the carbon black includes the following steps: S1, fixing a use amount of a shading agent, adding different contents of a carbon black, measuring a whiteness value of a composition, establishing a standard curve, and obtaining a standard equation; S2, measuring contents of the shading agent in compositions with different use amounts of the shading agent by using ICP-AES inductively coupled atomic emission spectrometer; and S3, calculating the content of the carbon black through the known content of the shading agent and the whiteness value.

Preferably, the glass fiber is an alkali-free glass fiber with a diameter of 7 to 17 μm and a length of 3 to 5 mm.

The smaller the diameter of the glass fiber is, the more the glass fiber is for the glass fiber of the same weight, the better the mechanical properties of the material have. When the diameter of the glass fiber is less than 7 μm, a manufacturing cost will be higher; when the diameter of the glass fiber is greater than 17 μm, the mechanical properties of the material will be reduced.

Preferably, the antioxidant is one or more of a hindered phenolic antioxidant, a phosphite ester antioxidant and a thioester antioxidant.

More preferably, the antioxidant is the hindered phenolic antioxidant.

The hindered phenolic antioxidant is RIANOX 1010 or SONOX 1010.

The phosphite ester antioxidant is RIANOX 168 or SONOX 168.

The thioester antioxidant is RIANOX 4125.

The present invention further provides a preparation method of a laser marking and shading enhanced PBT composition, including the following steps:

S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of each zone of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

The machining includes cooling through a water tank, air cooling and drying, granulating, and packaging.

The present invention further provides a use of the laser marking and shading enhanced PBT composition in preparation of a lamp cup shell, a capacitor, a connector, and a relay product.

Compared with the prior art, the present invention has the following beneficial effects.

The present invention provides a laser marking and shading enhanced PBT composition. The inventor unexpectedly discovers the synergistic effect of a shading agent and a carbon black, which greatly improving the laser marking performance and shading effect of the composition, and the obtained laser marking and shading enhanced PBT composition with the carbon black with a content within a range of 0.0033% to 0.033% of a weight of the shading agent can achieve the shading effect of a thickness less than 3 mm; a color difference before and after laser marking can reach above 15; a whiteness value is above 90. Since the present invention does not include a laser marking agent, the cost of materials can be greatly reduced and the economic practicality can be improved. The composition can be used in the field of preparing a lamp cup shell, a capacitor, a connector, or a relay product in lighting industry.

DETAILED DESCRIPTION OF EMBODIMENTS

Clear and intact description on the technical solution in the examples of the present invention will be made below, but the embodiments of the present invention are not limited to this.

Raw materials used in the following examples and comparative examples are as follows:

A. PBT resin: 1200-211M, Chang Chun Group, Taiwan;

B. Shading agent: titanium dioxide TR-33 (Shanghai Titanos Industry Co., Ltd.);

C. Carbon black: acetylene carbon black DENKA BLACK (Shanghai Mostbros Chemicals Co., Ltd.);

D. Glass fiber: alkali-free glass fiber ECS13-3.0-T436W (a diameter of glass fiber is 13 μm, and a length thereof is 3.0 mm, Taishan Fiberglass Inc.); and E. Antioxidant: selected from a hindered phenolic antioxidant RIANOX 1010 (Rianlon Corporation).

In the following examples and comparative examples, a PBT resin was prepared through the following method, and respective components were weighed according to parts by weight in Tables 1-5, and specific steps thereof were as follows:

S1, a dried PBT resin, a glass fiber, a shading agent, a carbon black and an antioxidant were mixed evenly, and a mixture was put into a main feeding hopper of a twin-screw extruder;

S2, the glass fiber was put into a side feeding hopper of the twin-screw extruder;

S3, a temperature of each zone of the twin-screw extruder was set to 220° C. to 250° C., a feeding amount thereof was set to 300 to 500 kg/h, and a host speed thereof was set to 300 to 400 rpm; and S4, a melt was extruded by the twin-screw extruder and then machined to obtain a laser marking and shading enhanced PBT composition.

A use amount of the carbon black was 0.0033% to 0.033% of a weight of the shading agent.

TABLE 1

| Contents of respective components of a PBT composition of Examples 1 to 4 | | | | |
|---|---|---|---|---|
| Parts by weight | Example 1 | Example 2 | Example 3 | Example 4 |
| A | 50 | 60 | 70 | 80 |
| B | 20 | 20 | 20 | 20 |
| C (weight percentage relative to B) | $3 \times 10^{-3}$ (0.015%) | $3 \times 10^{-3}$ (0.015%) | $3 \times 10^{-3}$ (0.015%) | $3 \times 10^{-3}$ (0.015%) |
| D | 20 | 20 | 20 | 20 |
| E | 0.2 | 0.2 | 0.2 | 0.2 |

TABLE 2

| Contents of respective components of a PBT composition of Examples 5 to 8 | | | | |
|---|---|---|---|---|
| Parts by weight | Example 5 | Example 6 | Example 7 | Example 8 |
| A | 60 | 60 | 60 | 60 |
| B | 6 | 6 | 10 | 10 |
| C (weight percentage relative to B) | $1.98 \times 10^{-4}$ (0.0033%) | $1.98 \times 10^{-3}$ (0.033%) | $3.3 \times 10^{-4}$ (0.0033%) | $3.3 \times 10^{-3}$ (0.033%) |
| D | 20 | 20 | 20 | 20 |
| E | 0.2 | 0.2 | 0.2 | 0.2 |

TABLE 3

| Contents of respective components of a PBT composition of Examples 9 to 12 | | | | |
|---|---|---|---|---|
| Parts by weight | Example 9 | Example 10 | Example 11 | Example 12 |
| A | 60 | 60 | 60 | 60 |
| B | 15 | 15 | 20 | 20 |
| C (weight percentage | $4.95 \times 10^{-4}$ (0.0033%) | $4.95 \times 10^{-3}$ (0.033%) | $6.6 \times 10^{-4}$ (0.0033%) | $6.6 \times 10^{-3}$ (0.033%) |

TABLE 3-continued

Contents of respective components of
a PBT composition of Examples 9 to 12

| Parts by weight | Example 9 | Example 10 | Example 11 | Example 12 |
|---|---|---|---|---|
| relative to B) | | | | |
| D | 20 | 20 | 20 | 20 |
| E | 0.2 | 0.2 | 0.2 | 0.2 |

TABLE 4

Contents of respective components of a
PBT composition of Examples 13 to 15

| Parts by weight | Example 13 | Example 14 | Example 15 |
|---|---|---|---|
| A | 60 | 60 | 60 |
| B | 20 | 20 | 20 |
| C (weight percentage relative to B) | $3 \times 10^{-3}$ (0.015%) | $3 \times 10^{-3}$ (0.015%) | $3 \times 10^{-3}$ (0.015%) |
| D | 15 | 25 | 30 |
| E | 0.2 | 0.2 | 0.2 |

TABLE 5

Contents of respective components of a PBT
composition of Comparative Examples 1 to 5

| Parts by weight | Comparative Example 1 | Comparative Example 2 | Comparative Example 3 | Comparative Example 4 | Comparative Example 5 |
|---|---|---|---|---|---|
| A | 60 | 60 | 60 | 60 | 60 |
| B | — | 20 | — | 20 | 20 |
| C (weight percentage relative to B) | — | — | $1 \times 10^{-4}$ (0.0005%) | $1 \times 10^{-4}$ (0.0005%) | 0.02 (0.1%) |
| D | 20 | 20 | 20 | 20 | 20 |
| E | 0.2 | 0.2 | 0.2 | 0.2 | 0.2 |

Comparative Examples 1 to 3 are compared with Example 2, wherein no shading agent and no carbon black are added in Comparative Example 1; no carbon black is added in Comparative Example 2; no shading agent is added in Comparative Example 3, but the content of the carbon black is 0.000500 of the shading agent; the content of the carbon black in Comparative Example 4 and in Comparative Example 5 is 0.0005% and 0.10% of the shading agent, respectively.

100×100 mm square plates with different thicknesses were subjected to injection molding, with thicknesses of 0.8, 1.0, 1.5, 2.0, 2.5, and 3.0 mm, respectively.

(1) Phone light was turned on and got close to the square plates with different thicknesses, whether the square plates completely shade light was observed to evaluate a shading thickness h.

(2) A whiteness value L of the square plates was measured by a spectrophotometry colorimeter.

(3) The square plates were subjected to laser marking by a laser marking machine, and a color difference ΔE of the square plates before and after laser marking was measured by the spectrophotometry colorimeter. A model of the laser marking machine used was TFL-M20 (Shenzhen TETE Laser Technology Co., Ltd.), and marking parameters were as follows: a power was 60% of a rated power, a frequency was 20 KHz, and a speed was 1,500 mm/s.

TABLE 6

Table for performance test data

| | Shading thickness h (mm) | Whiteness value L | Color difference (ΔE) |
|---|---|---|---|
| Example 1 | 0.8 | 93.12 | 36.12 |
| Example 2 | 0.8 | 92.78 | 35.56 |
| Example 3 | 0.8 | 92.47 | 34.13 |
| Example 4 | 0.8 | 92.03 | 32.98 |
| Example 5 | 2.5 | 94.12 | 17.5 |
| Example 6 | 1.5 | 90.23 | 24.75 |
| Example 7 | 2.0 | 95.11 | 18.71 |
| Example 8 | 1.0 | 90.48 | 29.85 |
| Example 9 | 1.5 | 95.32 | 30.46 |
| Example 10 | 0.8 | 90.33 | 42.05 |
| Example 11 | 1.0 | 96.78 | 32.89 |
| Example 12 | 0.8 | 90.58 | 48.12 |
| Example 13 | 0.8 | 92.54 | 36.88 |
| Example 14 | 0.8 | 92.40 | 34.66 |
| Example 15 | 0.8 | 92.30 | 33.12 |
| Comparative Example 1 | >3.0 | 91.45 | 10.13 |
| Comparative Example 2 | 1.5 | 97.96 | 13.55 |
| Comparative Example 3 | >3.0 | 89.54 | 11.22 |

TABLE 6-continued

Table for performance test data

| | Shading thickness h (mm) | Whiteness value L | Color difference (ΔE) |
|---|---|---|---|
| Comparative Example 4 | 1.5 | 97.57 | 13.88 |
| Comparative Example 5 | 0.8 | 83.15 | 14.55 |

In respective examples of the present invention, a shading effect with a whiteness value greater than 90 and a thickness less than 3 mm is achieved, and a color difference before and after laser marking can reach above 15. In which, from Examples 5 to 12, it can be seen that the shading thickness and the whiteness value are influenced by the contents of both the shading agent and the carbon black. Overall, the addition of the carbon black will increase the shading thickness and decrease the whiteness value, while the addition of the shading agent will increase the whiteness value and the shading thickness; when the shading agent and the carbon black are combined, the laser marking effect can be greatly improved, wherein when a preferred content of the shading agent is 15 to 20, the laser marking effect is better than that in Examples 5 to 8, however, the shading thickness and color difference value in Comparative Example 1 without adding the shading agent and the carbon black are much worse than those in respective examples; the laser marking effect in Comparative Example 2 without adding the carbon black is not good; the laser marking effect in Comparative Example 3 without adding the shading agent is not as good as that in examples, and a shading thickness thereof is greater than 3 mm. From Comparative Example 4 and Comparative Example 5, it can be seen that when the content of the carbon black is not between 0.0033% and 0.033% of the shading agent, the color difference value of laser marking is lower than that in respective examples.

Obviously, the above examples of the present invention are only instances for clearly illustrating the present invention, rather than limiting the embodiments of the present invention. For those of ordinary skill in the art, changes or modifications in other different forms may also be made on the basis of the above illustration. There is no need or inability to exhaustively list all embodiments here. Any amendment, equivalent replacement, improvement, etc., made within the spirit and principle of the present invention should be included within the scope of protection claimed by the present invention.

What is claimed is:

1. A laser marking and shading enhanced PBT composition, comprising the following components in parts by weight:
   50 to 80 parts of a PBT resin;
   6 to 20 parts of a shading agent;
   15 to 30 parts of a glass fiber;
   0.1 to 0.5 part of an antioxidant; and
   a carbon black being 0.0033% to 0.033% of a weight of the shading agent.

2. The laser marking and shading enhanced PBT composition of claim 1, comprising the following components in parts by weight:
   50 to 60 parts of the PBT resin;
   15 to 20 parts of the shading agent;
   15 to 30 parts of the glass fiber;
   0.1 to 0.5 part of the antioxidant; and
   the carbon black being 0.0033% to 0.033% of a weight of the shading agent.

3. The laser marking and shading enhanced PBT composition of claim 2, wherein the shading agent is one or more of titanium dioxide, zinc sulfide and antimony white.

4. The laser marking and shading enhanced PBT composition of claim 3, wherein the shading agent is the titanium dioxide.

5. The laser marking and shading enhanced PBT composition of claim 2, wherein the carbon black is an acetylene carbon black or a conductive carbon black.

6. The laser marking and shading enhanced PBT composition of claim 2, wherein the glass fiber is an alkali-free glass fiber with a diameter of 7 to 17 μm and a length of 3 to 5 mm.

7. The laser marking and shading enhanced PBT composition of claim 2, wherein the antioxidant is one or more of a hindered phenolic antioxidant, a phosphite ester antioxidant and a thioester antioxidant.

8. The laser marking and shading enhanced PBT composition of claim 7, wherein the antioxidant is the hindered phenolic antioxidant.

9. A preparation method of the laser marking and shading enhanced PBT composition of claim 1, comprising the following steps:
   S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

10. A use of the laser marking and shading enhanced PBT composition of claim 1 in preparation of a lamp cup shell, a capacitor, a connector, or a relay product.

11. A preparation method of the laser marking and shading enhanced PBT composition of claim 2, comprising the following steps:
   S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

12. A preparation method of the laser marking and shading enhanced PBT composition of claim 3, comprising the following steps:
   S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

13. A preparation method of the laser marking and shading enhanced PBT composition of claim 4, comprising the following steps:
   S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

14. A preparation method of the laser marking and shading enhanced PBT composition of claim 5, comprising the following steps:
   S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

15. A preparation method of the laser marking and shading enhanced PBT composition of claim 6, comprising the following steps:

S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

16. A preparation method of the laser marking and shading enhanced PBT composition of claim 7, comprising the following steps:

S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

17. A preparation method of the laser marking and shading enhanced PBT composition of claim 8, comprising the following steps:

S1, mixing a dried PBT resin, a glass fiber, a shading agent, a carbon black and an antioxidant evenly, and putting a mixture into a main feeding hopper of a twin-screw extruder;

S2, putting the glass fiber into a side feeding hopper of the twin-screw extruder;

S3, setting a temperature of the twin-screw extruder to 220° C. to 250° C., a feeding amount thereof to 300 to 500 kg/h, and a host speed thereof to 300 to 400 rpm; and S4, extruding a melt by the twin-screw extruder and then machining the melt to obtain a laser marking and shading enhanced PBT composition.

* * * * *